United States Patent [19]
Sakasegawa et al.

[11] 3,894,521
[45] July 15, 1975

[54] OVERHEAT PREVENTING DEVICE FOR MOTOR VEHICLE ENGINE

[75] Inventors: Hiroshi Sakasegawa; Yoichi Yamamoto, both of Yokohama, Japan

[73] Assignee: Nissan Motor Company Limited, Yokohama, Japan

[22] Filed: Dec. 4, 1973

[21] Appl. No.: 421,618

[30] Foreign Application Priority Data
Dec. 5, 1972   Japan............................ 47-139811

[52] U.S. Cl............................. 123/41.12; 123/41.49
[51] Int. Cl................................................. F01p 7/02
[58] Field of Search........... 123/41.11, 41.12, 41.49, 123/41.01

[56] References Cited
UNITED STATES PATENTS

| | | | |
|---|---|---|---|
| 1,373,848 | 4/1921 | Waite | 123/41.12 |
| 1,481,306 | 1/1924 | Stuart | 123/41.12 |
| 1,662,723 | 3/1928 | Snow | 123/41.12 |
| 1,900,586 | 3/1933 | Rippe | 123/41.12 |
| 1,934,783 | 11/1933 | Arterburn | 123/41.12 |
| 2,452,264 | 10/1948 | Russell | 123/41.12 |
| 2,530,180 | 11/1950 | Russell | 123/41.11 |
| 2,807,246 | 9/1957 | Jacobs | 123/41.12 |
| 3,120,219 | 2/1964 | Nallinger | 123/41.12 |
| 3,394,682 | 7/1968 | Bensinger | 123/41.12 |
| 3,621,822 | 11/1971 | Oster | 123/41.12 |

*Primary Examiner*—Manuel A. Antonakas
*Assistant Examiner*—Daniel J. O'Connor

[57] ABSTRACT

A motor vehicle engine provided with a radiator and a fan driven by the engine to cool the radiator, and an electric motor operatively connected to the fan through a one-way clutch to rotate the fan independently of the engine rotation and a control circuit of the electric motor, the electric motor being actuated when the engine speed is so low that the fan is not rotated at a speed to supply enough air for cooling the radiator satisfactorily.

3 Claims, 3 Drawing Figures

OVERHEAT PREVENTING DEVICE FOR MOTOR VEHICLE ENGINE

This invention relates to a cooling system of an engine of a motor vehicle, and particularly to an overheat preventing device for a motor vehicle engine.

In a motor vehicle having an engine with an exhaust gas purifier such as exhaust gas after burner, ventilation in the engine room is not sufficient and, in addition, the engine tends to overheat when driving at low speed due to additional heat generated by the exhaust gas purifier.

Especially, in the case of a motor vehicle provided with an air conditioner, a concenser is mounted directly in front of the radiator of the engine thereby to further restrict the engine room ventilation. As a result, when the motor vehicle is forced to travel slowly on a congested urban street, the engine is, as is well known, overheated to the extent that the engine stalls.

The stalling takes place because the addition of the condenser disposed in front of the radiator increases the flow resistance of air passing therethrough and, therefore, decreases the flow rate of air for cooling the radiator and because the air temperature is increased in passing through the condenser which generates heat when condensing the refrigerating medium, and therefore air relatively high in temperature is passed through the radiator.

When the engine stalls under such conditions the temperature of the engine room is increasingly raised due to heat generated by the engine itself or the exhaust gas purifier to overheat especially the fuel system. As a result, phenomena such as percolation and vapor lock inevitably take place and, accordingly, it becomes very difficult to restart the engine.

One well-known measure to prevent such overheating of an engine when driving at low speed is to increase the flow rate of cooling air drawn by a fan. Various methods have been heretofore proposed based on this measure. These methods include for instance, a method of increasing the idling speed of the engine and a method of providing an additional fan driven by an electric motor. However, the former method has disadvantages particularly in a vehicle provided with a torque converter in that it is accompanied with problems of creep and transmission shock and, in addition, the temperature of the exhaust gas purifier increases due to the increased amount of engine exhaust at idling. The latter method also has disadvantages in that a considerably large space is required for provision of an additional fan and electric motor in the engine room and, in addition, the fan and the electric motor disturb smooth introduction of cooling air when the motor vehicle is traveling at high speed.

The present invention is concerned generally with improvements in a motor-driven fan type cooling system, and contemplates to utilize the conventional engine-driven fan without providing an additional fan. In this invention, the engine-driven fan is driven by an electric motor independently of engine rotation through one-way clutches mounted between the engine-driven fan and the engine and between the electric motor and the fan; and the electric motor is actuated by the action of a control switch, which closes when the temperature of the radiator or the temperature or pressure of the condenser of an air conditioner is increased to cause overheating of the engine, to rotate the fan cooling the radiator and condenser, and which motor is also actuated by another control switch which closes after the engine is switched off to rotate the fan to rapidly cool the engine room.

It is an object of the present invention to provide an overheat preventing device for a motor vehicle engine which occupies only a small space in the engine room.

It is another object of the present invention to provide an overheat preventing device for a motor vehicle engine which does not restrain introduction of cooling air into the engine room.

It is still another object of the present invention to provide an overheat preventing device for a motor vehicle engine which is low in cost requiring no additional fan.

Other objects, features and advantages of the overheating preventing device for a motor vehicle engine according to the present invention will become more fully apparent from the following description taken in conjunction with the accompanying drawings, in which like reference numerals and characters designated corresponding parts and components and in which.

Figure 1:
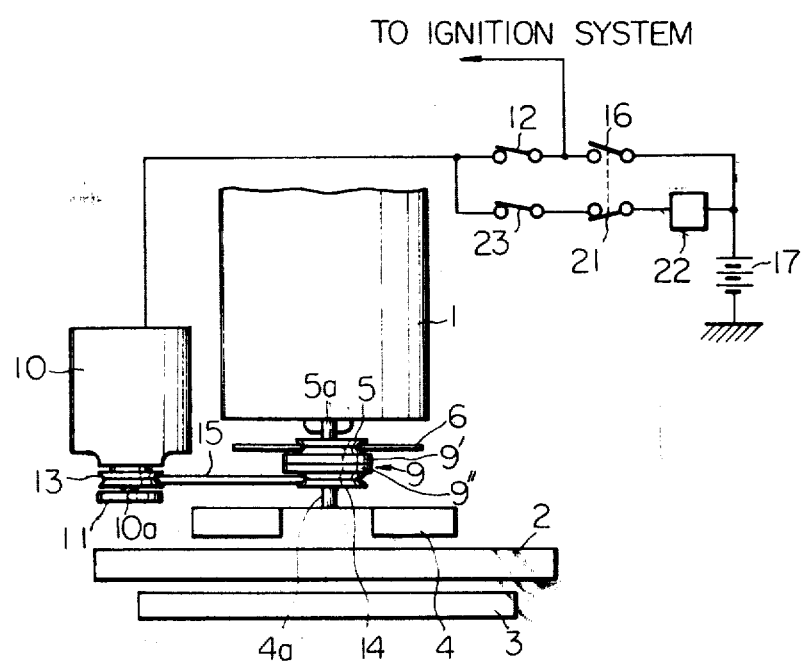
FIG. 1 is a schematic view of one preferred embodiment of a device according to the present invention.

Referring now to FIG. 1, which shows one preferred embodiment of an overheat preventing device constructed according to the invention, numeral 1 designates a vehicle engine, 2 a radiator for the engine 1, 3 a condenser for an air conditioner (not shown), 4 a fan for cooling the radiator and the condenser 2 and 3, 4a a fan shaft suitably supported, 5 a pulley fixed to a pulley shaft 5a slidably supported by the housing of the engine 1, and 6 a V belt engaged around an engine shaft (not shown) and the pulley 5 for driving the fan 4 connected to the pulley 5. A one-way clutch 9 is mounted between the pulley 5 and the fan 4 to selectively transmit power from the engine 1 to the fan 4. The one-way clutch 9 consists of a driving member 9' connected to the pulley shaft 5a and a driven member 9'' connected to the fan shaft 4a. An electric motor 10 having a shaft 10a is provided to drive the fan 4. When the fan 4 is driven by the motor 10, slipping takes place between the driving member 9' and the driven member 9'' when the motor speed is higher than the engine speed and, therefore, the fan 4 can be rotated independently of engine rotation. A clutch 11 is mounted on the shaft 10a to selectively rotate the fan 4 by the electric motor 10. The clutch 11 is actuated by a first control switch 12, which closes to engage the clutch 11 when the temperature of the radiator 2 is increased to a predetermined value or when the pressure or temperature of the condenser 3 is increased to a predetermined level. A pulley 13 is mounted on the motor shaft 10a adjacent the clutch 11, and another pulley 14 is mounted on the fan shaft 4a adjacent the fan 4. The pulley 13 and the pulley 14 are operatively connected by a V belt 15 to drive the fan 4. A power source such as a DC battery 17 mounted on the motor vehicle supplies electric energy through an ignition switch 16 and the control switch 12 to the electric motor 10. Electric energy from the battery 17 may also be supplied to the electric motor 10 through a delay switch 22, a second control switch 21 and a thermosensitive switch 23 connected in parallel with the ignition switch 16 and the control switch 12 connected in series with each other. The control switch 21 is so interlocked with the ignition switch 16 that it is closed when the ignition switch 16 is opened. The delay switch 22 may preferably be either a conventional time switch which is actuated to close for a predetermined time when the control switch 21 is closed, or a transistor switch with a delay circuit. The operation of the thermosensitive switch 23 will be hereinafter described in greater detail.

In operation of the device thus constructed, when the ignition switch 16 is closed, the engine 1 may be started. During engine operation, if the coolant temperature of the radiator 2, or the pressure or temperature of the condenser 3 is raised to a predetermined level due to low engine speed, the control switch 12 is closed so that electric energy is supplied from the battery 17 to the electric motor 10 through the ignition switch 16 and the control switch 12. As a result, the motor 10 is energized to rotate the fan 4 independently of the engine rotation through the clutch 11, pulley 13, V belt 15, pulley 14 and one-way clutch 9 to cool the fluids in the radiator 2 and in the condenser 3.

Figure 2:
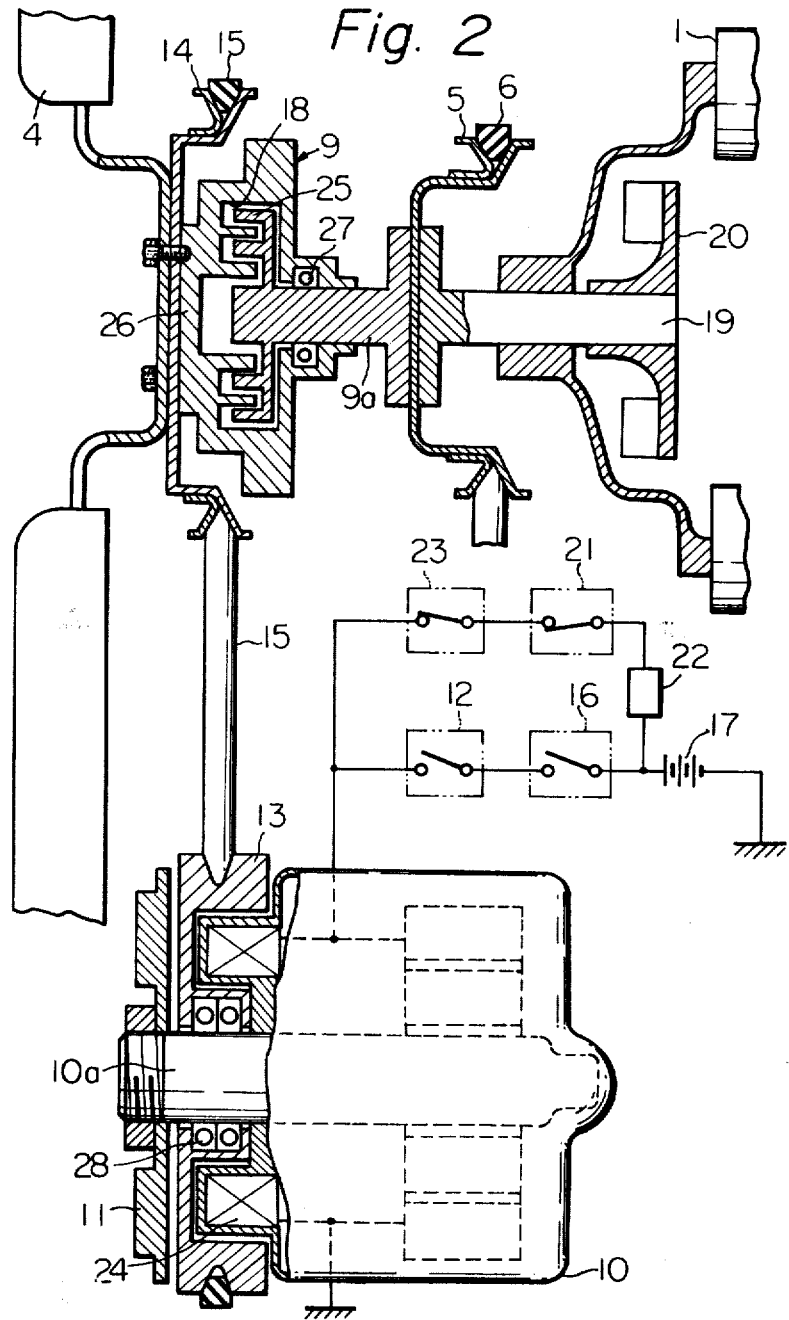
FIG. 2 is a schematic view of another preferred embodiment of a device of the present invention.

Reference is now made to FIG. 2, which shows another embodiment of a device of this invention.

In this embodiment, a fluid coupling filled with, for instance, silicon oil 18 is used as the one-way clutch 9 of the first embodiment of the device shown in FIG. 1. This fluid coupling 9 has an impeller 25 fixed to a drive shaft 9a which is integrally connected to a shaft 19 operatively connected to the engine output shaft (not shown). A water pump 20 is mounted on the shaft 19 to circulate engine coolant through the radiator 2. The fluid coupling 9 also has a runner 26 slidably mounted on the shaft 9a through bearings 27 and is also connected to the pulley 14 and fan 4.

In operation, when the impeller 25 is driven by the engine 1 through the drive shaft 9a connected to the shaft 19, the runner 26 is driven by the impeller 25 through the fluid medium such as silicon oil 18 filling the fluid coupling 9 to drive the fan 4 mechanically connected to the runner 26.

In this embodiment, an electromagnetic clutch is used as the clutch 11. A pulley 13 is slidably mounted on the motor shaft 10a and supported by bearings 28. A magnetic coil 24 is mounted in the electric motor 10 for electromagnetically coupling the pulley 13 with the clutch 11. This magnetic coil 24 is energized simultaneously with energization of the electric motor 10 which takes place when the temperature of the radiator 2, the pressure or temperature of the condenser 3 reaches, or the vehicle speed decreases to a predetermined value. As a result, the pulley 13 is driven by the electric motor 10 and, accordingly, the fan 4 connected to the pulley 14 is also rotated through the V belt 15. In this case, when the rotating speed of the shaft 9a is lower than that of the pulley 14 driven by the electric motor 10 through the V belt 15, pulley 13 and clutch 11, and accordingly when the rotating speed of the impeller 25 of the fluid coupling 9 is lower than that of the runner 26 thereof, the runner 26 thus driven by the electric motor 10 slips with respect to the impeller 25 through the silicon oil 18 filling the fluid coupling 9. As a result, the runner 26 and accordingly the fan 4 are driven at high speed by the electric motor 10 regardless of the rotating speed of the engine and accordingly the impeller 25. Therefore, even if the engine speed is low, the rotating speed of the fan 4 can be increased to satisfactorily cool the radiator 2 and the condenser 3 in order to avoid overheating the engine 1.

When the ignition switch 16 is opened to stop the engine 1 in the above embodiments shown in FIGS. 1 and 2, the control switch 21 is closed as aforementioned and the delay switch 22 is closed for a given period, for example, for 1 to 3 minutes. As a result, the electric motor 10 remains energized by the power source 17, and accordingly the fan 4 is driven by the motor 10 to cool the engine room as well as the radiator 2 and the condenser 3. Thus, the engine 1 can be easily restarted. In this circuit, the thermosensitive switch 23 is provided to close only when the atmospheric temperature is above a predetermined value, e.g., 30°C, and is electrically connected in series with the control switch 21 and the delay switch 22. Thus, when the atmospheric temperature is low as in winter and therefore the engine is not liable to overheat even after the engine stops, the electric motor 10 is not energized after the engine 1 is stopped because the switch 23 remains opened. Thus, waste of electric power of the battery 17 can be avoided.

Under normal conditions, the control switches 12 and 21 are opened. Therefore, the electric motor 10 is not energized. As a result, the fan 4 is not driven by the electric motor 10, but is driven by the engine 1 through the shafts 19, 9a, and fluid coupling 9 provided with the impeller 25 and runner 26. In this case, the pulley 13 is idle and freely rotated by the pulley 14, because the electromagnetic clutch 11 is also de-energized.

Figure 3:
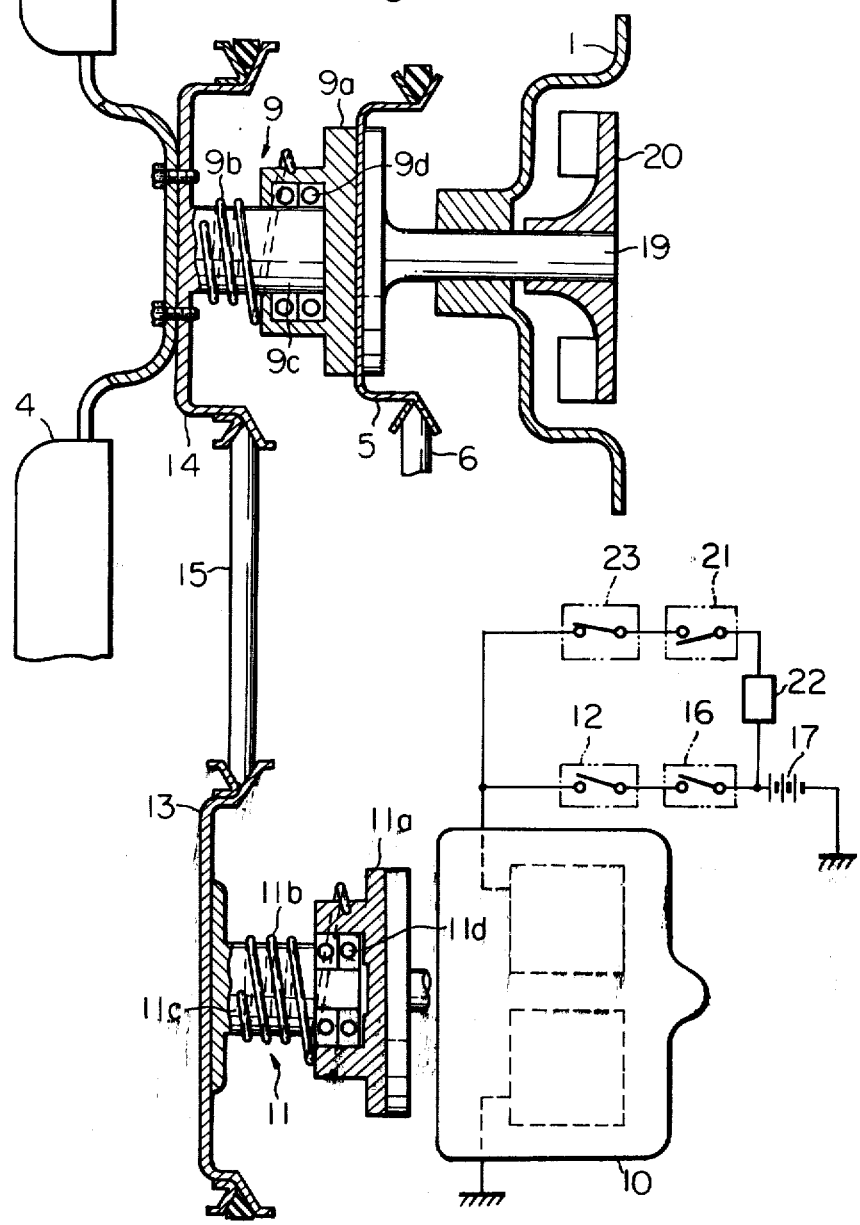
FIG. 3 is a schematic view of still another preferred embodiment of a device of the present invention.

Referring now to FIG. 3, which shows still another embodiment of a device of the invention, spring type one-way clutches are used as the clutches 9 and 11. These one-way clutches may also be of a roller-type, ratch-type or any other suitable type.

The clutch 9 has a drive portion 9a connected to the shaft 19 through the pulley 5. A helical spring 9b is fixed at its one end to the drive portion 9a. A driven shaft 9c is rotatably mounted in the drive portion 9a through bearings 9d and is fixed at its front end to the fan 4 through the pulley 14. The helical spring 9b is mounted around the driven shaft 9c in such a manner that when the drive portion 9a is rotated faster than the driven shaft 9c, the spring 9b acts to engage the drive portion 9a with the driven shaft 9c by friction, and vice versa. The clutch 11 has the same structure as the clutch 9. A drive portion 11a is connected to the electric motor 10. A helical spring 11b is fixed at its one end to the drive portion 11a, and the driven shaft 11c is rotatably mounted in the drive portion 11a through bearings 11d and is secured at its front end to the pulley 13.

In normal operation of the above embodiment, when the engine 1 is running, the drive portion 9a connected to the engine 1 is driven by the engine 1 through the shaft 19 connected to the engine 1, the driven shaft 9c is driven by the drive portion 9a through the frictional engagement of the helical spring 9b with the driven shaft 9c driving the fan 4 mechanically connected to the driven shaft 9c through the pulley 14. In this case, the pulley 13 is rotated by the pulley 14 through the V belt 15, however, since the helical spring 11b on the driven shaft 11c is rotated in the direction of freewheeling, the pulley 13 runs idle.

When the temperature of the radiator is raised to a predetermined value or the pressure or temperature of the condenser is increased to a predetermined level, the control switch 12 is closed to energize the electric motor 10 by the battery 17 through the ignition switch 16 and the control switch 12. As a result, the drive portion 11a of the clutch 11 is driven by the motor 10 and accordingly the driven shaft 11c is driven by the drive portion 11a through the spring 11b frictionally engaged with the driven shaft 11c to drive the pulley 13 engaged with the pulley 14 through the V belt 15 and accordingly the fan 4 connected to the pulley 14. In this case, since the drive portion 9a driven by the engine 1 is rotated at a lower speed than the driven shaft 9c driven by the electric motor 10 through the pulley 14, V belt 15 and pulley 13, the helical spring 9b on the driven shaft 9c has been selected to have a low spring value so as not to disturb the high speed rotation of the driven shaft 9c driven by the electric motor 10. In case where the engine is stopped to close the switch 21, operation is the same as above. Thus the engine 1 is prevented from overheating by running the cooling fan even when the temperature of the radiator 2 tends to raise and the pressure or temperature of the condenser tends to increase.

It should be understood from the foregoing description that since the device of the present invention comprises an electric motor for independently driving the fan for cooling the radiator and the condenser for an air conditioner of a motor vehicle, pulleys, a V belt and clutches in addition to a conventional cooling system of the engine so as to increase the air flow by the fan when the engine is rotated at low speed and also to rotate the fan for a predetermined time after the engine is stopped, overheating of the engine is avoided even when the temperature of the radiator or the pressure or temperature of the condenser tends to increase. It should also be understood that since the space required for mounting a device of this invention is very small and the electric motor can be mounted at the rear of the radiator and at the side of the engine in the engine room of a vehicle, the electric motor does not restrain the cooling air flow when the vehicle travels at high speed. It should also be understood that since a device of the present invention does not require an additional fan for cooling the radiator and condenser, it is economical.

What is claimed is:

1. An overheat preventing device in a motor vehicle having an engine, a radiator through which a pump circulates engine coolant, a condenser for an air conditioner comprising;
    a fan;
    a one-way clutch;
    a first pulley on a shaft supported by the engine and engeable with said fan through said one-way clutch;
    and fan being normally rotated from the engine shaft through said one-way clutch, when engaged, and a first V-velt means to air cool the contents of the radiator and the condenser;
    an electric motor with a motor shaft;
    a second pulley mounted freely rotatably on said motor shaft;
    a third pulley fixedly mounted on said fan;
    a clutch means fixedly mounted on said motor shaft and engageable with said second pulley for said second pulley to be rotatable with said motor shaft;
    said fan being rotatable by said electric motor through said second pulley when engaged by said clutch, a second V-belt and said third pulley;
    an ignition switch and a first control switch means connected in series between said motor and a battery, said first control switch means closing to energize said motor when one of the temperature in said radiator, the temperature and pressure in said condenser reaches a predetermined value and the vehicle speed decreases below a predetermined value;
    a second control switch means, a delay switch and a thermosensitive switch also connected in series between said motor and the battery and in parallel with said ignition switch and said first control switch means being closed when said ignition switch is opened, and said thermosensitive switch closing only when the ambient temperature is above a predetermined level to energize said motor for a predetermined period through said delay switch and said second control switch means when said ignition switch is open.

2. A device as claimed in claim 1, wherein said one-way clutch is a fluid coupling comprising an impeller operatively connected to said engine shaft through said first pulley, a runner connected to said fan and slidably mounted on said first pulley shaft, and wherein said clutch is an electromagnetic clutch means having a magnetic coil mounted in said electric motor for electromagnetically coupling said second pulley and said motor when energized by said battery to drive said fan when one of the temperature of said radiator, the pressure and temperature of said condenser reaches a predetermined value and vehicle speed decreases to a predetermined value.

3. A device as claimed in claim 1, wherein said one-way clutch and said clutch are of spring type, said one-way clutch having its drive portion operable by said engine shaft, a helical spring fixed at its one end to said drive portion and its other end forming a one-way connection with said third pulley; said clutch having its drive portion fixed to said motor shaft, a helical spring fixed at its one end to said drive portion and its other end frictionally driving said second pulley.

* * * * *